(12) United States Patent
Fukuda

(10) Patent No.: US 8,931,705 B2
(45) Date of Patent: Jan. 13, 2015

(54) IC CARD, MOBILE ELECTRONIC DEVICE AND DATA PROCESSING METHOD IN IC CARD

(75) Inventor: Aki Fukuda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 100 days.

(21) Appl. No.: 13/231,171

(22) Filed: Sep. 13, 2011

(65) Prior Publication Data

US 2012/0067947 A1      Mar. 22, 2012

(30) Foreign Application Priority Data

Sep. 16, 2010   (JP) .................................. 2010-208542

(51) Int. Cl.
  *H04Q 5/22*    (2006.01)
  *G06K 19/07*   (2006.01)
  *H04W 4/00*    (2009.01)
  *H04W 74/08*   (2009.01)
  *H04W 80/00*   (2009.01)

(52) U.S. Cl.
  CPC .......... *G06K 19/0723* (2013.01); *H04W 4/003* (2013.01); *H04W 74/0841* (2013.01); *H04W 80/00* (2013.01)
  USPC ........ 235/492; 340/10.1; 340/10.2; 340/10.3; 340/10.31; 340/10.32

(58) Field of Classification Search
  CPC ............ G06K 7/0008; G06K 19/0723; G06K 7/10297; G06K 7/10019
  USPC ....................................................... 235/492
  See application file for complete search history.

(56) References Cited

U.S. PATENT DOCUMENTS

2002/0139861 A1 * 10/2002 Matsumoto et al. .......... 235/492
2004/0162932 A1    8/2004 Mizushima et al.
(Continued)

FOREIGN PATENT DOCUMENTS

| CN | 101470797 A | 7/2009 |
|---|---|---|
| EP | 0 709 803 A2 | 5/1996 |
| JP | 2010-146414 | 7/2010 |

OTHER PUBLICATIONS

Extended European Search Report dated Apr. 16, 2012 in corresponding EP Application No. 11181391.1.
Search Report and Written Opinion mailed on Jun. 21, 2012 in corresponding Singapore Patent Application No. 201106630-5.
(Continued)

*Primary Examiner* — Christopher Stanford
(74) *Attorney, Agent, or Firm* — Posz Law Group, PLC

(57) ABSTRACT

According to one embodiment, an IC card includes a communication module, a first command processing module, a determining module, a second command processing module, a response processing module. The first command processing module performs a process corresponding to a first command received from the external device. The determining module determines whether a second command is contained in a data portion of the first command. The second command processing module performs a process corresponding to the second command if the determining module determines that the second command is contained in the data portion of the first command. The response processing module sets a processing result of the second command executed by the second command processing module in the data portion of the response indicating a processing result of the first command executed by the first command processing module and transmit the same to the external device.

11 Claims, 8 Drawing Sheets

(56) References Cited

U.S. PATENT DOCUMENTS

| | | |
|---|---|---|
| 2005/0225447 A1 | 10/2005 | Diorio et al. |
| 2006/0175406 A1* | 8/2006 | Dressen ................. 235/451 |
| 2007/0223521 A1* | 9/2007 | Teruyama ................. 370/463 |
| 2009/0168807 A1 | 7/2009 | Nakatsugawa et al. |
| 2010/0012723 A1* | 1/2010 | Tuda ................. 235/439 |
| 2010/0243738 A1* | 9/2010 | Shimizu et al. ................. 235/439 |
| 2011/0111802 A1* | 5/2011 | Richter et al. ................. 455/558 |

OTHER PUBLICATIONS

Office action dated Nov. 21, 2013 in the corresponding CN application No. 201110274942.5 (and English translation).

International Standard ISO/IEC 14443-3 "Identification cards—Contactless integrated circuit(s) cards—Proximity cards—" First edition, pp. i-48 (Feb. 1, 2001) (discussed on page 1 of the Specification).

* cited by examiner

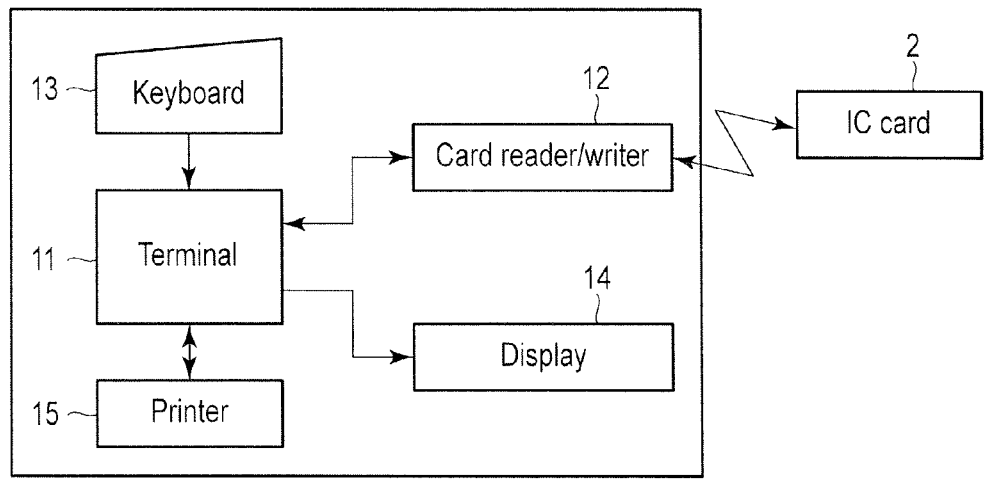
F I G. 1
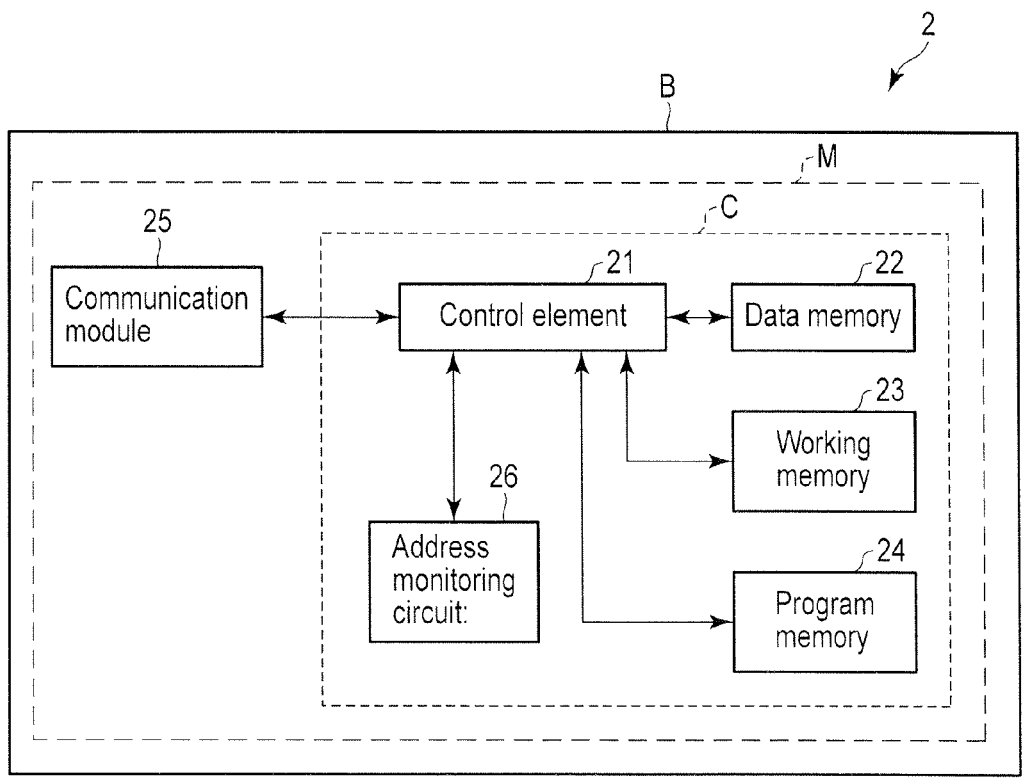
F I G. 2

| Tag | Len | Value |
|---|---|---|
| | | Application 1, Application 2, Application 3 |

FIG. 7A

| 6F | Len | | | FCI Templete |
|---|---|---|---|---|
| | 84 | Len | | DF Name |
| | A5 | Len | | FCI Proprietary Templete |
| | | BF0C | | FCI Issuer Discretionary Data |

FIG. 7B

| BF0C | Len | | | |
|---|---|---|---|---|
| | 61 | Len | | |
| | | 4F | Len | AID |
| | | 87 | Len | Application Priority Indicator |
| | | 50 | Len | Application Label |
| | 61 | Len | | |
| | | 4F | Len | AID |
| | | 87 | Len | Application Priority Indicator |
| | | 50 | Len | Application Label |

FIG. 7C

IC CARD, MOBILE ELECTRONIC DEVICE AND DATA PROCESSING METHOD IN IC CARD

CROSS-REFERENCE TO RELATED APPLICATIONS

This application is based upon and claims the benefit of priority from prior Japanese Patent Application No. 2010-208542, filed Sep. 16, 2010, the entire contents of which are incorporated herein by reference.

FIELD

Embodiments described herein relate generally to an IC card, a mobile electronic device and a data processing method in the IC card.

BACKGROUND

A contactless IC card (smart card) includes a communication module for making communication with an external device by contactless communication, a nonvolatile memory in which data can be written or rewritten and a control element. The contactless IC card performs a process in response to a command given from the external device. The process that can be performed by the contactless IC card is defined by ISO/IEC14443, for example. In ISO/IEC14443, an initialization and anti-collision process of making communication with one contactless IC card selected from a plurality of contactless IC cards with which the external device can communicate and a command process by use of a block transfer protocol (T=CL) successively performed after the above process are defined.

BRIEF DESCRIPTION OF THE DRAWINGS

FIG. 1 is a block diagram schematically showing an example of the configuration of an IC card (smart card) and IC card processing apparatus.

FIG. 2 is a block diagram schematically showing an example of the hardware configuration of the IC card.

FIG. 7A shows an example of Higher Layer Response in the response for the ATTRIB command.

FIG. 7B shows an example of Higher Layer Response in the response for the ATTRIB command.

FIG. 7C shows an example of Higher Layer Response in the response for the ATTRIB command.

DETAILED DESCRIPTION

Figure 3:
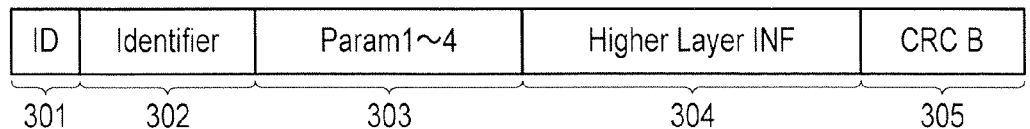
FIG. 3 shows an example of the configuration of an ATTRIB command.

In general, according to one embodiment, an IC card includes a communication module, a first command processing module, a determining module, a second command processing module, a response processing module. The first command processing module performs a process corresponding to a first command received from the external device. The determining module determines whether a second command is contained in a data portion of the first command. The second command processing module performs a process corresponding to the second command if the determining module determines that the second command is contained in the data portion of the first command. The response processing module sets a processing result of the second command executed by the second command processing module in the data portion of the response indicating a processing result of the first command executed by the first command processing module and transmit the same to the external device.

There will now be described embodiments with reference to the drawings.

FIG. 1 is a block diagram schematically showing an example of the configuration of an IC card (mobile electronic device, smart card) 2 according to the present embodiment and an IC card processing apparatus 1 used as an external apparatus having a function of communication with the IC card 2.

First, the configuration of the IC card processing apparatus 1 is explained.

As shown in FIG. 1, the IC card processing apparatus 1 includes a terminal device 11, card reader/writer 12, keyboard 13, display 14, printer 15 and the like.

The terminal device 11 controls the operation of the whole portion of the IC card processing apparatus 1. The terminal device 11 includes a CPU, various memories and various interfaces. For example, the terminal device 11 is configured by a personal computer (PC).

The terminal device 11 has a function of transmitting a command to the IC card 2 via the card reader/writer 12, a function of performing various processes based on data received from the IC card 2 and the like. For example, the terminal device 11 performs a control operation to write data in a nonvolatile memory in the IC card 2 by transmitting a data write command to the IC card 2 via the card reader/writer 12. Further, the terminal device 11 performs a control operation to read data from the IC card 2 by transmitting a data read command to the IC card 2.

The card reader/writer 12 is an interface device that communicates with the IC card 2. The card reader/writer 12 is configured by an interface corresponding to the communication system of the IC card 2. When the IC card 2 is a contactless IC card, the card reader/writer 12 includes an antenna and communication control module used for performing radio communication with the IC card 2. In the card reader/writer 12, supply of electric power, supply of a clock, reset control and data reception/transmission with respect to the IC card 2 are performed. With the above configuration, the card reader/writer 12 activates (starts) the IC card 2, transmits various commands and receives a response with respect to the transmitted command under control of the terminal device 11, for example.

The keyboard 13 functions as an operation module operated by an operator of the IC card processing apparatus 1 and various operation instructions and data items are input thereto by the operator. The display 14 is a display device that displays various information items under control of the terminal device 11. The printer 15 prints and outputs various data items such as processing results.

Next, the hardware configuration of the IC card 2 is explained.

When receiving power or the like from a host device such as the IC card processing apparatus 1, the IC card 2 is activated (set in an operative state). The IC card 2 is a contactless IC card that is connected to the IC card processing apparatus based on the contactless communication system. That is, the IC card 2 used as the contactless IC card receives waves from the IC card processing apparatus 1 via an antenna and modulation/demodulation circuit used as a communication interface, and generates an operation clock and operation electric power by means of a power source module (not shown) based on the waves.

FIG. 2 is a block diagram schematically showing an example of the hardware configuration of the IC card 2 of this embodiment.

The IC card 2 contains module M in a casing that configures main body B. Module M is integrally formed with one or a plurality of IC chips C in a state in which an external interface (communication interface) for communication is connected thereto and embedded in main body B of the IC card 2. Further, as shown in FIG. 2, module M of the IC card 2 includes a control element 21, data memory 22, working memory 23, program memory 24, communication module 25 and the like.

The control element 21 controls the whole portion of the IC card 2. The control element 21 is operated based on a control program and control data stored in the program memory 24 or data memory 22 to realize various functions. For example, the control element 21 executes a program of the operating system to perform the basic operation control of the IC card 2. Further, the control element 21 executes an application program corresponding to the application object of the IC card 2 to perform various operation controls corresponding to the application states of the IC card 2.

The data memory 22 is configured by a data programmable or reprogrammable nonvolatile memory such as an EEPROM (Electrically Erasable Programmable Read-Only Memory) or flash ROM, for example. In the data memory 22, various data items and control programs (application programs) corresponding to the operation applications of the IC card 2 are written. In the data memory 22, various files corresponding to the standard of the IC card 2 are defined and various data items are written in the files.

The working memory 23 is a volatile memory such as a RAM. Further, the working memory 23 has a function of a buffer that temporarily stores data now being processed by the control element 21.

The program memory 24 previously stores control programs and control data. The program memory 24 is a nonvolatile memory such as a mask ROM, for example. The program memory 24 in which control programs or control data items are stored in the IC card manufacturing stage is incorporated in the IC card 2. That is, the control programs or control data items stored in the program memory 24 are used to control the basic operation of the IC card and are previously incorporated according to the specification of the IC card.

The communication module 25 is an interface used for communication with the card reader/writer 12 of the IC card processing apparatus 1. The communication module 25 includes a communication control module such as a modulation/demodulation circuit that makes radio communication with the card reader/writer 12 of the IC card processing apparatus 1 and an antenna for receiving and transmitting waves.

Next, the communication process between the IC card processing apparatus 1 and the IC card 2 is explained.

The IC card processing apparatus 1 and IC card 2 make communications based on contactless communication. The IC card processing apparatus 1 can be set in a state in which contactless communication can be made with a plurality of IC cards 2. In order to make communication between the IC card processing apparatus and a specified contactless IC card without fail, an initialization and anti-collision process becomes necessary. For example, in ISO14443 Type B, an ATTRIB command is defined as a command used in the initialization and anti-collision process to set up communication between the IC card processing apparatus 1 and one contactless IC card 2.

FIG. 3 shows an example of the configuration of an ATTRIB command. The ATTRIB command is one example of a command used in the initialization and anti-collision process. In the example shown in FIG. 3, the ATTRIB command includes a command identification portion 301, card identification portion 302, parameter portion 303, data portion 304 and check code portion 305.

In the command identification portion 301, identification information indicating that the command is an ATTRIB command is stored. In FIG. 3, in the command identification portion 301, a command identifier (ID) indicating that the command is an ATTRIB command is stored. As shown in FIG. 3, a command identifier of the ATTRIB command is defined as "ID" in ISO14443 Type B. In the card identification portion 302, identification information used for specifying a transmission destination of the command is stored. In the example shown in FIG. 3, identification information (identifier) of the contactless IC card 2 used for specifying one of the contactless IC cards 2 as a communication partner of contactless communication is stored in the card identification portion 302. The parameter portion 303 is an area in which parameters in contactless communication are stored. In the example shown in FIG. 3, four parameters can be stored in the parameter portion 303.

The data portion 304 is an area that can store data. The data portion 304 of the ATTRIB command is called Higher Layer INF (INFormation). Generally, in a process performed only for setting up communication between the IC card processing apparatus 1 and the contactless IC card 2, Higher Layer INF as the data portion 304 is set in an unused state (vacant state) in many cases. In this embodiment, commands that can be executed by the contactless IC card 2 are stored in the data portion 304. In the data portion 304, one or a plurality of commands can be stored. Each command stored in the data portion 304 is command APDU (application protocol data unit). Further, code information that checks the entire data of the command (ATTRIB command) is stored in the data portion 304.

Data of a preset format can be stored in the data portion 304. That is, in the data portion 304, one or a plurality of commands of a preset format can be stored. For example, in the data portion 304, the respective commands are stored as data with a TLV structure (that is hereinafter also referred to as TLV data). The data with the TLV structure is a data string having Tag data, Length data and Value data sequentially arranged. Tag indicates identification information of the data string. Length indicates the length of Value data following immediately after the above data. Value data is an actual data value.

Figure 4:
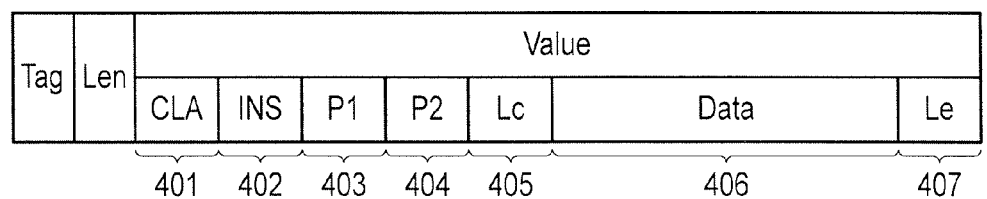
FIG. 4 shows an example of a command stored in a data portion of the command.

FIG. 4 shows an example of a command stored as data in the data portion of the command.

As shown in FIG. 4, each command APDU is stored in the data portion 304 as Value in TLV data. When a plurality of commands (second commands) are stored in the data portion 304 of the command (first command), a plurality of TLV data items each using command APDU as Value are stored in succession in the data portion 304. Further, the TLV data using command APDU as Value is set to a value (information) indicating that the value of TAG is a command.

As shown in FIG. 4, each command APDU includes a CLA portion 401, INS portion 402, P1 portion 403, P2 portion 404, Lc portion 405, Data portion 406 and Le portion 407. In the CLA portion 401 and INS portion 402, information indicating the content of the command is stored. In the P1 portion 403 and P2 portion 404, a parameter of the command is stored. In the Lc portion 405, information indicating the length of data is stored. Data used for a process of the command is stored in the Data portion 406.

Figure 5:
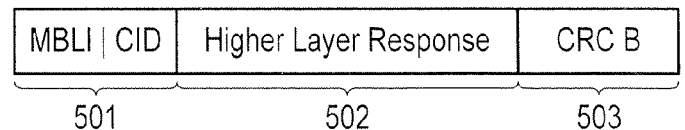
FIG. 5 shows an example of the configuration of a response with respect to the ATTRIB command.

FIG. 5 shows an example of the configuration of a response with respect to the ATTRIB command shown in FIG. 3.

In the configuration example shown in FIG. 5, a response to the ATTRIB command includes an identification portion 501, data portion 502 and check code portion 503. In the identification portion 501, identification information of the response such as MBLI and CID is stored. The data portion 502 is an area in which data can be stored. The data portion 502 of a response to the ATTRIB command is called Higher Layer Response.

In the present embodiment, response data indicating the processing result with respect to each command that is stored in the data portion 304 of the ATTRIB command is stored in the data portion 502. Response data with respect to each command is stored in a preset data format (for example, one or a plurality of TLV structures) in the data portion 502. In the check code portion 503, code information for checking data of the whole response is stored.

Next, a process for the ATTRIB command in the contactless IC card is explained.

Figure 6:
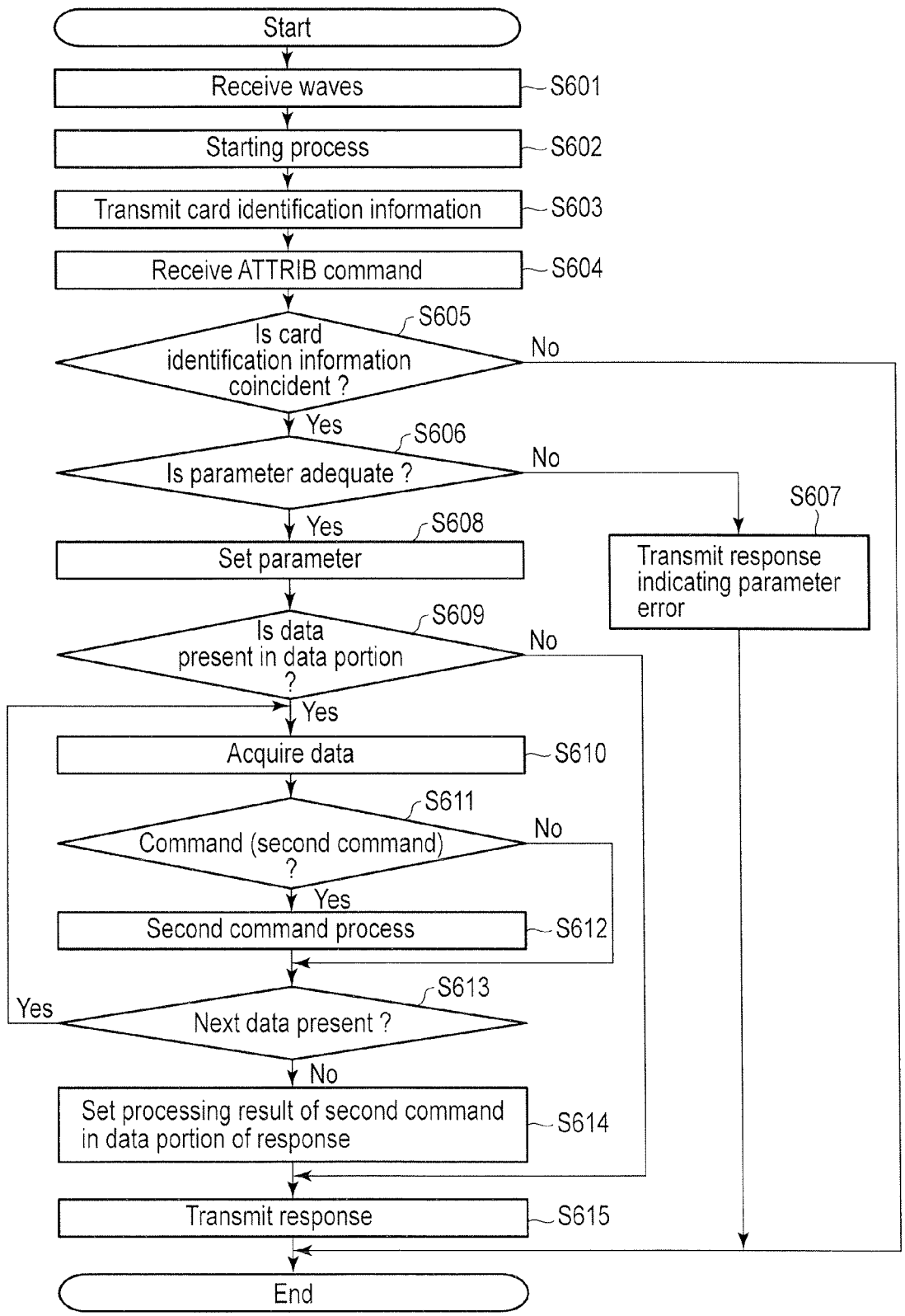
FIG. 6 is a flowchart for illustrating an example of the process for the ATTRIB command.

FIG. 6 is a flowchart for illustrating an example of the process for the ATTRIB command in the contactless IC card.

When entering a range of communication with the IC card processing apparatus 1, the contactless IC card 2 receives waves from the IC card processing apparatus 1 by means of the antenna of the communication module 25 (step S601). The contactless IC card 2 is activated by electric power of the power source generated from the received waves (step S602). The control element 21 of the contactless IC card 2 supplied with electric power of the power source transmits card identification information used for identifying (specifying) the contactless IC card 2 to the IC card processing apparatus 1 (step S603). The card identification information may be a fixed value previously stored in the data memory 22 or program memory 24 or a value dynamically (or randomly) generated.

After transmitting the card identification information, the contactless IC card 2 is set into a waiting state to wait for a command from the IC card processing apparatus 1. The IC card processing apparatus 1 determines one of the contactless IC cards as a communication destination based on the contactless IC card (communicable contactless IC card) from which the card identification information is acquired. The IC card processing apparatus 1 specifies card identification information of the contactless IC card set as a communication destination in the command.

The IC card processing apparatus 1 transmits an ATTRIB command that has specified card identification information of the contactless IC card of the communication destination to perform an initialization and anti-collision process. The IC card processing apparatus 1 can store one or a plurality of command APDU in the data portion (Higher Layer INF) of the ATTRIB command. For example, the IC card processing apparatus 1 stores a command that becomes necessary following after the ATTRIB command in Higher Layer INF. As the command that becomes necessary following after the ATTRIB command, for example, a command that requests outputting of an application list that supports contactless communication may be provided.

After transmitting card identification information, the contactless IC card 2 that makes communication with the IC card processing apparatus 1 receives an ATTRIB command from the IC card processing apparatus 1 (step S604). When receiving the ATTRIB command, the control element 21 of the contactless IC card 2 determines whether or not identification information stored in the card identification portion 302 of the ATTRIB command coincides with the card identification information of the contactless IC card 2 (step S605). If it is determined that the card identification information items do not coincide (NO in step S605), the control element 21 is set into a state to wait for reception of a command.

If it is determined that the card identification information items coincide (YES in step S605), the control element 21 determines whether or not the value of a parameter stored in the parameter portion 303 of the received ATTRIB command is adequate (step S606). If it is determined that the value of the parameter of the received ATTRIB command is not adequate (NO in step S606), the control element 21 transmits a response to the effect that the value of the parameter is an error (step S607) and is set into a state to wait for command reception.

Further, if it is determined that the value of the parameter of the received ATTRIB command is adequate (YES in step S606), the control element 21 determines whether or not data is present in the data portion 303 of the received ATTRIB command (step S609). If it is determined that data (Higher Layer INF) is not present in the received ATTRIB command (NO in step S609), the control element 21 transmits a response to the effect that the process is correctly terminated as the processing result of the ATTRIB command to the IC card processing apparatus 1 (step S615) and is set in a state to wait for command reception.

If it is determined that data is present in the data portion 304 of the received ATTRIB command (YES in step S609), the control element 21 sequentially acquires (extracts) data items (for example, data items of the data string unit with the TLV structure) present in the data portion 304 of the received ATTRIB command (step S610). When acquiring one data, the control element 21 determines whether the data is a command (second command) or not (step S611). For example, the control element 21 determines whether each data contained in the data portion 304 is a command or not based on identification information of the data. If data stored in the data portion 304 is TLV data, whether each TLV data is a command or not may be determined by Tag of each TLV data. In this case, the control element 21 can determine whether each data is a command or not based on the value of Tag of each data.

If it is determined that data extracted from the data portion 304 of the ATTRIB command is not a command (NO in step S611), the control element 21 determines whether next data is present in the data portion 304 or not (step S613). If next data is present in the data portion 304 (YES in step S613), the control element 21 returns the process to step S610 and performs a process of steps S610 to S613 for the next data present in the data portion 304.

If it is determined that data extracted from the data portion 304 of the ATTRIB command is a command (YES in step S611), the control element 21 performs a command process corresponding to the command (second command) (step S612). For example, a command that requires outputting of an application list supported by the contactless IC card can be stored in the data portion 304. When such a command is attached to the data portion 304, the control element 21 performs an application list select process together with a process of the ATTRIB command.

Further, the contactless IC card 2 outputs the result of the command process corresponding to a command (second command) contained in the data portion 304 as a response of the ATTRIB command to the IC card processing apparatus 1. For this purpose, the control element 21 stores information indicating the result of the command process corresponding to the second command in a memory such as the working memory 23.

When there is no more next data in the data portion 304, that is, when the process of steps S610 to S612 is performed for all of the data items in the data portion 304 (NO in step S613), the control element 21 sets the result of a process performed in response to a second command in the data portion 502 in a response (ATTRIB response) with respect to the ATTRIB command (step S614). It is supposed that the processing result with respect to the second command is data (for example, data with the TLV structure) to which identification information set to correspond to each second command attached to the ATTRIB command is attached.

If an ATTRIB response having the processing result with respect to the second command set in the data portion is formed, the control element 21 transmits the thus formed ATTRIB response to the IC card processing apparatus 1 (step S615). Further, if no command is present in the data portion 304 of the ATTRIB command (NO in step S609), the control element 21 transmits an ATTRIB response in which the data portion 502 is omitted to the IC card processing apparatus 1 (step S615).

FIGS. 7A, 7B and 7C show examples of data (Higher Layer Response) output as the data portion 502 in the response with respect to the ATTRIB command. FIGS. 7A, 7B and 7C show examples in each of which PPSE (Proximity Payment System Environment) that is a SELECT command as command APDU stored in the data portion 304 of the ATTRIB command and outputs an application list supported by the contactless IC card is selected.

Figure 8:
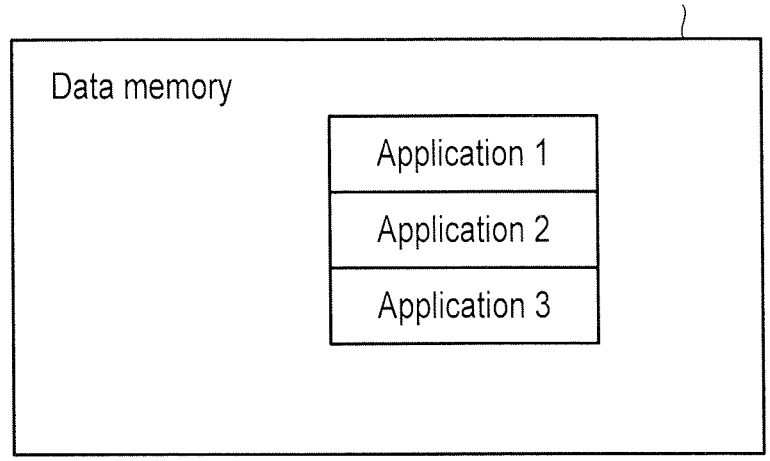
FIG. 8 shows a state in which three applications are stored in a data memory of the contactless IC card.

FIG. 8 shows a state in which three applications 1, 2, 3 are stored in the data memory 22 of the contactless IC card 2. The three applications 1, 2, 3 are applications supported by the contactless IC card. FIGS. 7A, 7B and 7C show examples of Higher Layer Response with respect to the ATTRIB command containing a command that requests an application list to the contactless IC card 2 having the data memory 22 as shown in FIG. 8.

FIG. 7A schematically shows the configuration of Higher Layer Response. In the example shown in FIG. 7A, Higher Layer Response is a data string of the TLV structure (that is also referred to as TLV data). Further, in the example shown in FIG. 7A, TLV data has the nesting structure to output a plurality of application lists. Each TLV data indicates the meaning of Value according to the value of Tag.

FIG. 7B is a diagram showing a concrete example of Higher Layer Response. In the example shown in FIG. 7B, the entire portion of Higher Layer Response is defined as a data string of Tag "6F". Higher Layer Response in which Tag shown in FIG. 7B is "6F" is data of FCI (File Control Information) Template. FCI Template includes a data string with Tag of "84" and a data string with Tag of "A5". Further, the data string with Tag of "A5" includes data with Tag of "BF0C". In the example shown in FIG. 7B, data with Tag of "BF0C" is FCI Issuer Discretionary Data. FCI Issuer Discretionary Data is data shown in FIG. 7C. In FIG. 7C, two applications are indicated by TLV data as FCI Issuer Discretionary Data with Tag of "BF0C".

If a command that requests an application list is attached to (or contained in) the data portion (Higher Layer INF) of the ATTRIB command, an application list that is provided in the contactless IC card can be provided by Higher Layer Response as shown in FIG. 7 in the response of the ATTRIB command.

Next, another example of a command that is used in the initialization and anti-collision process and to which one or a plurality of commands can be attached is explained.

Figure 9:
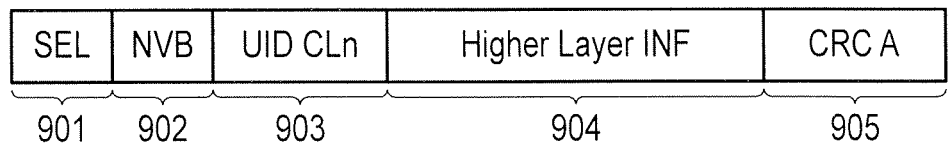
FIG. 9 shows an example of a SELECT command.

FIG. 9 shows an example of a SELECT command used in ISO14443 Type A.

A SELECT command shown in FIG. 9 is one example of a command used in the initialization and anti-collision process. In the example shown in FIG. 9, the SELECT command includes a definition portion 901, parameter portion 902, identification portion 903, data portion 904 and check code portion 905. However, in the present ISO14443 Type A, the data portion of the SELECT command is not defined. That is, the SELECT command of FIG. 9 has the structure having a data portion attached to the SELECT command defined in the present ISO14443 Type A.

The definition portion 901 indicates Cascade Level (CL). In the example shown in FIG. 9, Cascade Level is "SEL" and indicates that the command is a SELECT command. In ISO14443 Type A, it is defined that "SEL" indicates a SELECT command. The parameter portion 902 indicates Number of Valid Bit (NVB). The parameter portion 903 indicates Unique Identification (UID) of Cascade Level n (CLn). That is, the identification portion 903 indicates unique identification information (UID).

The data portion 904 is an area in which data can be stored. In the example shown in FIG. 9, the data portion 904 in the SELECT command is called Higher Layer INF (INFormation). Further, the check code portion 905 stores code information (CRC A) used for checking data of the entire portion of the command (SELECT command).

In the present embodiment, data of a preset format can be stored in the data portion 904. In the data portion 904, one or a plurality of commands (command APDU) of a preset format can be stored. For example, each command is stored as TLV data in the data portion 904. In each TLV data stored in the data portion 904, whether or not data of Value is a command is determined based on the value of Tag.

Figure 10:
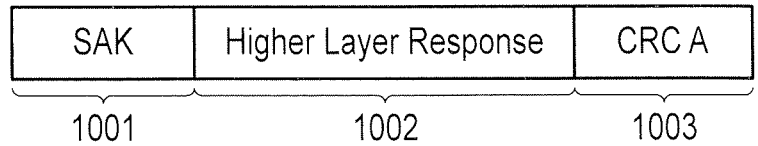
FIG. 10 shows the configuration of a response for the SELECT command.

FIG. 10 shows the configuration of a response with respect to the SELECT command shown in FIG. 9.

In the configuration example shown in FIG. 10, the response with respect to the SELECT command includes an identification portion 1001, data portion 1002 and check code portion 1003. In the identification portion 1001, information indicating a process for a command is stored. In the example shown in FIG. 10, information (SAK: Select AcKnowledge) indicating that a process for the SELECT command is terminated is stored. In ISO14443 Type A, it is defined that "SAK" is the response of the SELECT command.

The data portion 1002 is an area in which data can be stored. The data portion 1002 is a response (Higher Layer Response) corresponding to Higher Layer INF of the SELECT command shown in FIG. 9. That is, the data portion 1002 contains a response with respect to one or a plurality of commands attached to the data portion (Higher Layer INF) 904 of the received command. Further, response data with respect to each command is stored with a preset data format (for example, with the TLV structure) in the data portion 1002. The check code portion 1003 stores code information for checking data of the whole response.

Next, a process for the SELECT command in the contactless IC card 2 is explained.

Figure 11:
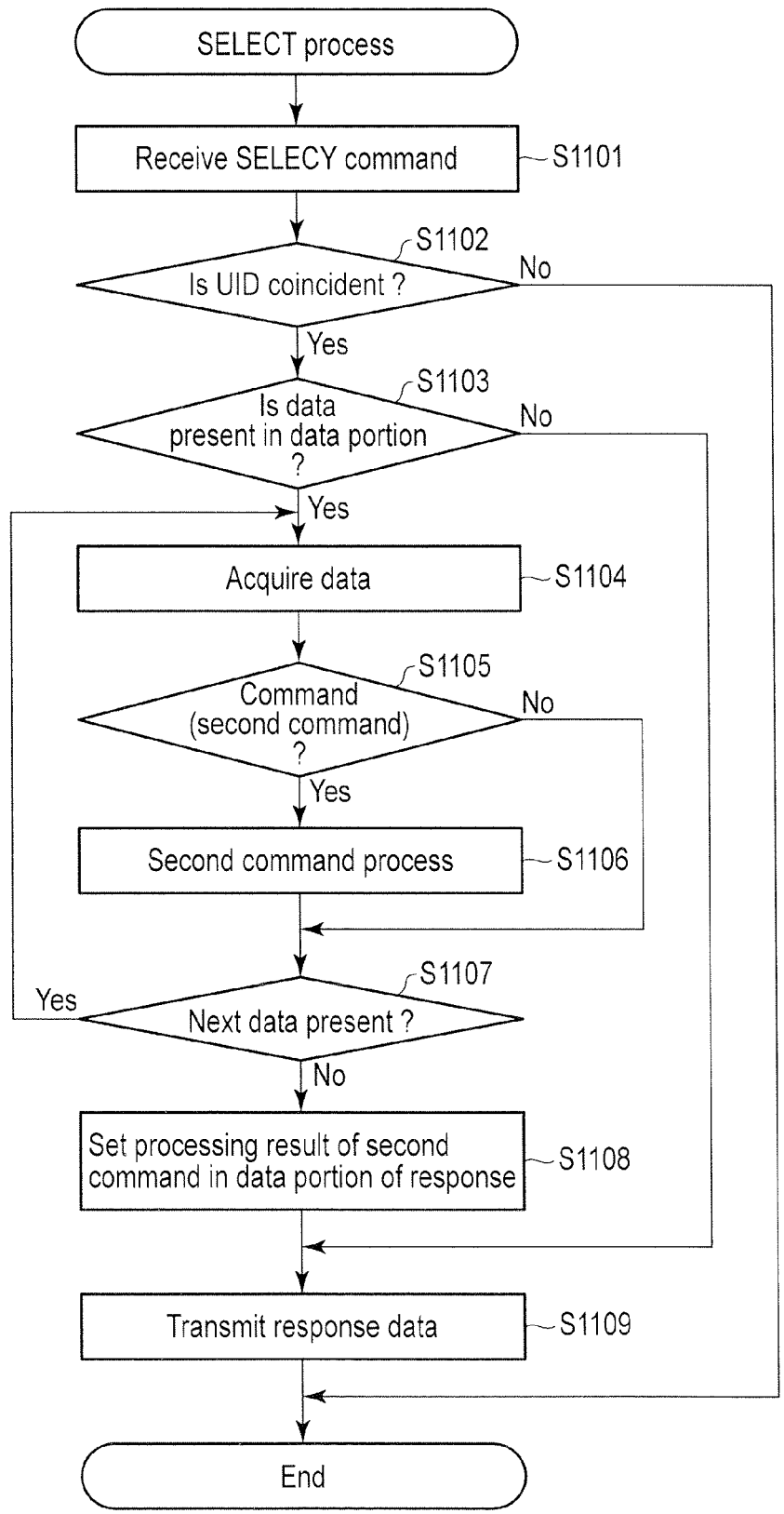
FIG. 11 is a flowchart for illustrating an example of the process with respect to the SELECT command.

FIG. 11 is a flowchart for illustrating an example of the process for the SELECT command in the contactless IC card 2.

In this example, first, it is supposed that the contactless IC card 2 has received a SELECT command from the IC card processing apparatus 1 (step S1101). The control element 21 of the contactless IC card 2 recognizes that the received command is the SELECT command shown in FIG. 9 based on information of "SEL" stored in the definition portion 901 of the received command. For example, as shown in FIG. 9, the SELECT command has a data portion as Higher Layer INF. In Higher Layer INF, one or a plurality of commands (second commands) can be stored.

When receiving the SELECT command, the control element 21 of the contactless IC card 2 collates UID contained in the received SELECT command (step S1102). If collation of UID fails, the control element 21 sets the contactless IC card 2 in a state to wait for reception of a next command. If collation of UID is succeeded (YES in step S1102), the control element 21 determines whether or not data (Higher Layer INF) is present in the received SELECT command (step S1103).

If it is determined that no data is present in the received SELECT command (NO in step S1103), the control element 21 transmits response data to the effect that the process is normally terminated as the processing result of the SELECT command to the IC card processing apparatus 1 (step S1109) and is set into a state to wait for command reception.

If it is determined that data is present in the data portion 904 of the received SELECT command (YES in step S1103), the control element 21 sequentially acquires (extracts) data items (for example, data items in the data string unit of the TLV structure) present in the data portion 904 of the SELECT command (step S1104). When acquiring one data from the data portion 904 of the SELECT command, the control element 21 determines whether or not the data is a command (second command) (step S1105). For example, the control element 21 determines whether or not each data contained in the data portion 904 is a command based on identification information of the data. When data with the TLV structure is stored in the data portion 904, whether each data is a command or not may be determined based on Tag of each data. In this case, the control element 21 can determine whether each data is a command or not according to the value of Tag of each data.

If it is determined that data extracted from the data portion 904 of the SELECT command is not a command (NO in step S1105), the control element 21 determines whether or not next data is present in the data portion 904 (step S1107). If next data is present in the data portion 904 (YES in step S1105), the control element 21 returns the process to step S1104 and performs a process of steps S1104 to S1107 for next data present in the data portion 904.

Further, if it is determined that data extracted from the data portion 904 of the SELECT command is a command (YES in step S1105), the control element 21 performs a command process corresponding to the command (second command) (step S1106). The control element 21 incorporates the processing result corresponding to the command (second command) attached to the data portion 904 into a response (SAK) of the SELECT command and outputs the same to the IC card processing apparatus 1. For this purpose, the control element 21 stores information indicating the processing result performed according to the second command in a memory such as the working memory 23.

If there is no more next data in the data portion 904 of the SELECT command, that is, when a process of steps S1105 to S1107 is performed for all of the data items in the data portion 904 (NO in step S1107), the control element 21 sets information indicating the result of a process performed according to the second command in the data portion 1002 of a response with respect to the SELECT command (step S1008). It is assumed that the processing result with respect to each second command is data (for example, data with the TLV structure) to which identification information set to correspond to each second command attached to the SELECT command is attached.

When a response having the data portion in which the processing result with respect to the second command is set is formed, the control element 21 transmits the thus formed response to the IC card processing apparatus 1 (step S1109). Further, if no command is present in the data portion 904 of the SELECT command, the control element 21 may transmit a response having the data portion 1002 omitted to the IC card processing apparatus 1.

Figure 12:
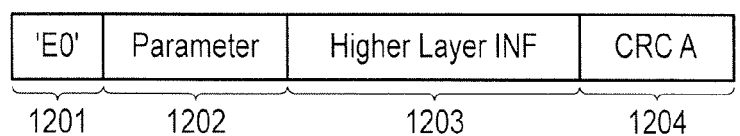
FIG. 12 shows an example of a RATS command.

FIG. 12 shows an example of a RATS (Request for Answer To Select) command used in ISO14443 Type A.

The RATS command shown in FIG. 12 is one example of a command used in the initialization and anti-collision process. In the example shown in FIG. 12, the RATS command includes a definition portion 1201, parameter portion 1202, data portion 1203 and check code portion 1204. In the present ISO14443 Type A, the data portion is not defined in the RATS command. Therefore, the RATS command shown in FIG. 12 has the structure obtained by attaching the data portion to the RATS command defined by the present ISO14443 Type A.

The definition portion 1201 indicates Start Byte. In the example shown in FIG. 12, Start Byte is set to "E0". The parameter portion 1202 indicates a to-be-set parameter (Parameter). The data portion 1203 is an area in which data can be stored. In the example shown in FIG. 12, the data portion 1203 in the RATS command is called Higher Layer INF (INFormation). Further, the check code portion 1204 stores code information (CRC A) used for checking data of the whole portion of the command (RATS command).

In this embodiment, data of a preset format can be stored in the data portion 1203. In the data portion 1203, one or a plurality of commands (command APUD) can be stored with a preset format. For example, in the data portion 1203, each command is stored as data with the TLV structure. Data with the TLV structure is a data string in which Tag data, Length data and Value data are sequentially arranged. Tag indicates identification information of the data string. Length indicates the length of Value data following immediately after the above data. Value data is an actual data value. Whether TLV data stored in the data portion 1203 is a command or not is determined based on Tag.

Figure 13:
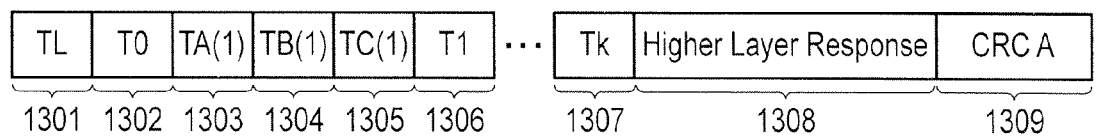
FIG. 13 shows the configuration of a response for the RATS command.

FIG. 13 shows the configuration of a response with respect to the RATS command shown in FIG. 12.

In the configuration example shown in FIG. 13, a response (ATS) with respect to the RATS command includes TL 1301, T0 1302, TA(1) 1303, TB(1) 1304, TC(1) 1305, T1 1306, . . . , Tk 1307. TA(1) 1303 to TC(1) 1305 following after T0 1302 are interface bytes (Interface Bytes). T1 1306 to Tk 1307 are historical bytes (Historical Bytes).

The data portion 1308 is an area in which data can be stored. The data portion 1308 is a response (Higher Layer Response) corresponding to Higher Layer INF of the RATS command shown in FIG. 12. That is, the data portion 1308 contains a response for one or a plurality of commands attached to the data portion (Higher Layer INF) 1203 of the received command. Further, in the data portion 1308, information indicating the processing result for each command is stored with a preset data format (for example, with the TLV structure). The check code portion 1309 stores code information used for checking data of the whole portion of the response.

Next, a process for the RATS command in the contactless IC card 2 is explained.

Figure 14:
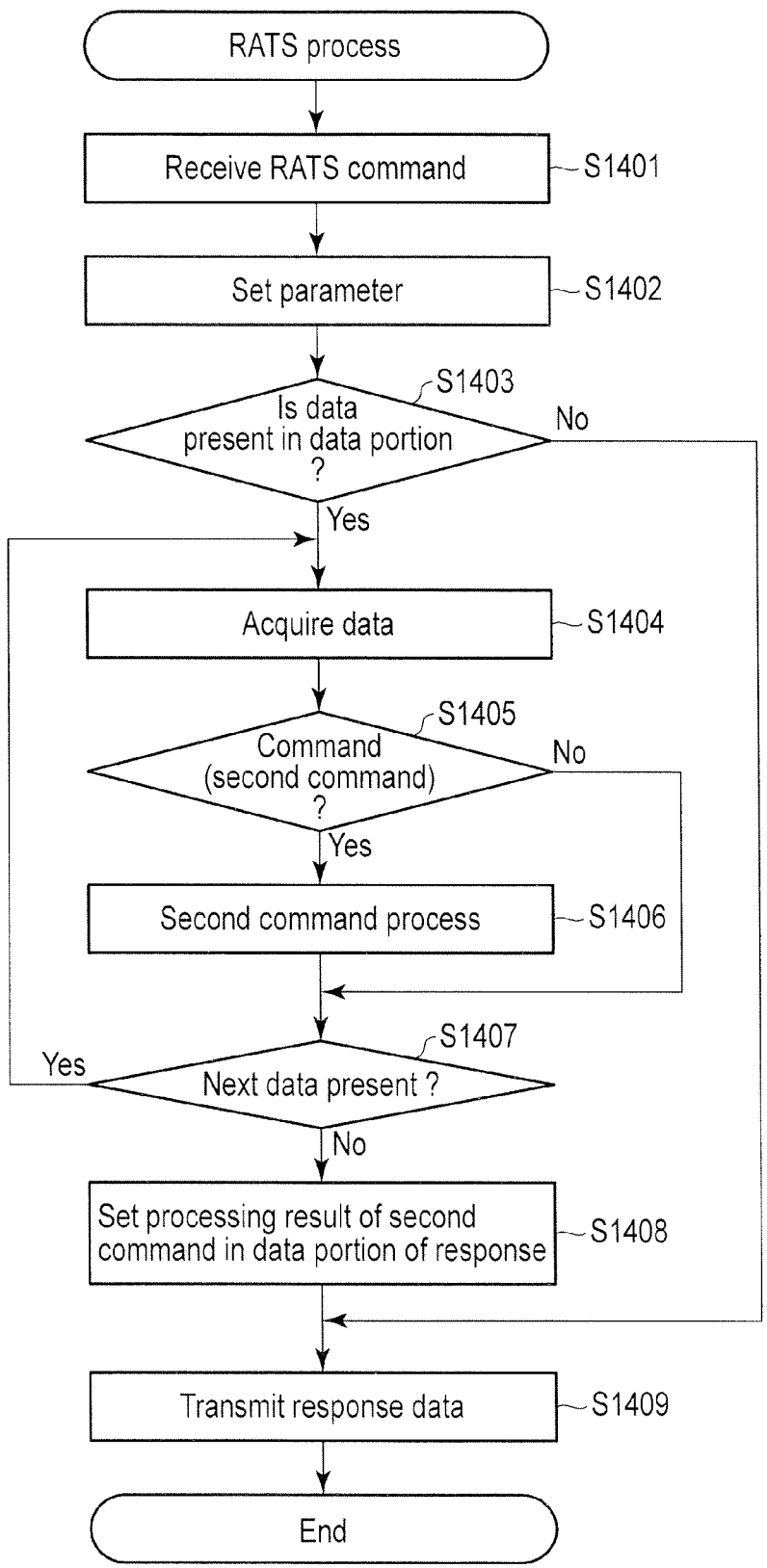
FIG. 14 is a flowchart for illustrating an example of the process with respect to the RATS command.

FIG. 14 is a flowchart for illustrating an example of the process for the RATS command in the contactless IC card 2.

In this example, first, it is assumed that the contactless IC card 2 has received a RATS command from the IC card processing apparatus 1 (step S1401). For example, as shown in FIG. 12, in the RATS command, the data portion 1203 can be attached as Higher Layer INF. In Higher Layer INF, one or a plurality of commands (second commands) can be stored.

When receiving the RATS command, the control element 21 of the contactless IC card 2 sets a parameter contained in the parameter portion 1202 of the received RATS command (step S1402). When a parameter specified by the parameter portion 1202 is set, the control element 21 determines whether or not data (Higher Layer INF) is present in the received RATS command (step S1403).

If it is determined that no data is present in the received RATS command (NO in step S1403), the control element 21 transmits response data to the effect that a process is normally terminated as the processing result of the RATS command to the IC card processing apparatus 1 (step S1409) and is set into a state to wait for command reception.

If it is determined that data is present in the received RATS command (YES in step S1403), the control element 21 sequentially acquires (extracts) data items (for example, data items in the data string unit of the TLV structure) present in the data portion 1203 of the RATS command (step S1404). When acquiring one data from the data portion 1203 of the RATS command, the control element 21 determines whether or not the data is a command (second command) (step S1405). For example, the control element 21 determines whether or not each data contained in the data portion 1203 is a command based on identification information of the data. When data with the TLV structure is stored in the data portion 1203, whether each data is a command or not may be determined based on Tag of each data. In this case, the control element 21 can determine whether each data is a command or not according to the value of Tag of each data.

If it is determined that data extracted from the data portion 1203 of the RATS command is not a command (NO in step S1405), the control element 21 determines whether or not next data is present in the data portion 1203 (step S1407). If next data is present in the data portion 1203 (YES in step S1405), the control element 21 returns the process to step S1404 and performs a process of steps S1404 to S1407 for next data present in the data portion 1203.

Further, if it is determined that data extracted from the data portion 1203 of the RATS command is a command (YES in step S1405), the control element 21 performs a command process corresponding to the command (second command) (step S1406). The control element 21 incorporates the processing result corresponding to the command (second command) attached to the data portion 1203 into a response (ATS) of the RATS command and outputs the same to the IC card processing apparatus 1. For this purpose, the control element 21 stores information indicating the result of the process performed according to the second command in a memory such as the working memory 23.

If there is no more next data in the data portion 1203 of the RATS command, that is, when a process of steps S1405 to S1407 is performed for all of the data items in the data portion 1203 (NO in step S1407), the control element 21 sets information indicating the result of the process performed according to the second command in the data portion 1308 of a response with respect to the RATS command (step S1408). It is assumed that the processing result with respect to each second command is data (for example, data with the TLV structure) to which identification information set to correspond to each second command attached to the RATS command is attached.

When a response (ATS) having the data portion 1308 in which the processing result with respect to the second command is set is formed, the control element 21 transmits the thus formed response to the IC card processing apparatus 1 (step S1409). Further, if no command is present in the data portion 1203 of the RATS command, the control element 21 may transmit a response having the data portion 1308 omitted to the IC card processing apparatus 1.

As described above, when the contactless IC card of this embodiment receives a first command from the external device, the IC card performs a process corresponding to the first command and determines whether or not one or a plurality of second commands are contained in the first command. When the second commands are contained in the first command, the contactless IC card performs a process corresponding to each second command. The contactless IC card sets information indicating the processing result for the second command in the data portion of the response with respect to the first command and transmits the same to the external device. According to this embodiment, the number of communications between the contactless IC card and the contactless IC card processing apparatus can be reduced and a command process by contactless communication can be efficiently performed.

Further, a command for the initialization and anti-collision process can be applied as the first command and a command to be executed after communication is set up by the initialization and anti-collision process can be applied as the second command. As a result, a command to be executed after communication is set up by the initialization and anti-collision process can be transmitted by use of a command for the initialization and anti-collision process. Further, in the initialization and anti-collision process and in a process after the initialization and anti-collision process, the number of communications between the contactless IC card and the contactless IC card processing apparatus can be reduced and a command process by contactless communication can be efficiently performed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An integrated circuit (IC) card comprising:
   a communication module configured to make contactless data communication with an external device, a first command processing module configured to perform a process corresponding to a first command, including a command identifier portion and a data portion, received from the external device, a determining module configured to determine, based on a value of a Tag of TLV data, whether a second command is set in a Value of the TLV data, when the TLV data is contained in the data portion of the first command, a second command processing module configured to perform a process corresponding to the second command when the determining module determines that the second command is set in the Value of the TLV data, when the TLV data is contained in the data portion of the first command, and a response processing module configured to set a processing result of the second command executed by the second command processing module in a data portion of a response indicating a processing result of the first command executed by the first command processing module and to transmit the response to the external device.

2. The IC card according to claim 1, wherein
the first command is a command used for an anti-collision process with the IC card specified as a communication destination and the second command is attached to the data portion of the first command.

3. The IC card according to claim 1, wherein
the first command is a command used for setting a communication parameter and the second command is attached to the data portion of the first command.

4. The IC card according to claim 2, wherein
the first command is a command used for setting a communication parameter and the second command is attached to the data portion of the first command.

5. An IC card according to claim 1, further comprising:
a general module that includes the communication module, the first command processing module, the determining module, the second command processing module, and the response processing module, and
a main body including the general module.

6. A mobile electronic device comprising:
a communication module configured to make contactless data communication with an external device,
a first command processing module configured to perform a process corresponding to a first command, including a command identifier portion and a data portion, received from the external device,
a determining module configured to determine, based on a value of a Tag of TLV data, whether a second command is set in a Value of the TLV data, when the TLV data is contained in the data portion of the first command,
a second command processing module configured to perform a process corresponding to the second command when the determining module determines that the second command is set in the Value of the TLV data, when the TLV data is contained in the data portion of the first command, and
a response processing module configured to set a processing result of the second command executed by the second command processing module in a data portion of a response indicating a processing result of the first command executed by the first command processing module and to transmit the response to the external device.

7. A data processing method of an integrated circuit (IC) card that makes contactless data communication with an external device, comprising:
performing a process corresponding to a first command, including a command identifier portion and a data portion, received from the external device,
determining, based on a value of a Tag of TLV data, whether a second command is set in a Value of the TLV data, when the TLV data is contained in the data portion of the first command,
performing a process corresponding to the second command when it is determined that the second command is set in the Value of the TLV data, when the TLV data is contained in the data portion of the first command, and
setting a processing result with respect to the second command in the data portion of a response indicating a processing result of the first command and transmitting the response to the external device.

8. The data processing method of the IC card according to claim 7, wherein
the first command is a command used for an anti-collision process with the IC card specified as a communication destination and the second command is attached to the data portion of the first command.

9. The data processing method of the IC card according to claim 7, wherein
the first command is a command used for setting a communication parameter and the second command is attached to the data portion of the first command.

10. The data processing method of the IC card according to claim 8, wherein
the first command is a command used for setting a communication parameter and the second command is attached to the data portion of the first command.

11. An integrated circuit (IC) card processing apparatus comprising:
a processing module configured to generate a first command, including a command identifier portion and a data portion in which TLV data is set, the TLV data having a Value in which a second command is set and a Tag in which information indicating that the Value of the TLV data is a command is set;
a transmitting module configured to transmit the first command to an IC card; and
a receiving module configured to receive a response indicating a processing result of the first command executed by the IC card and set a processing result of the second command in a data portion of the response.

* * * * *